United States Patent Office.

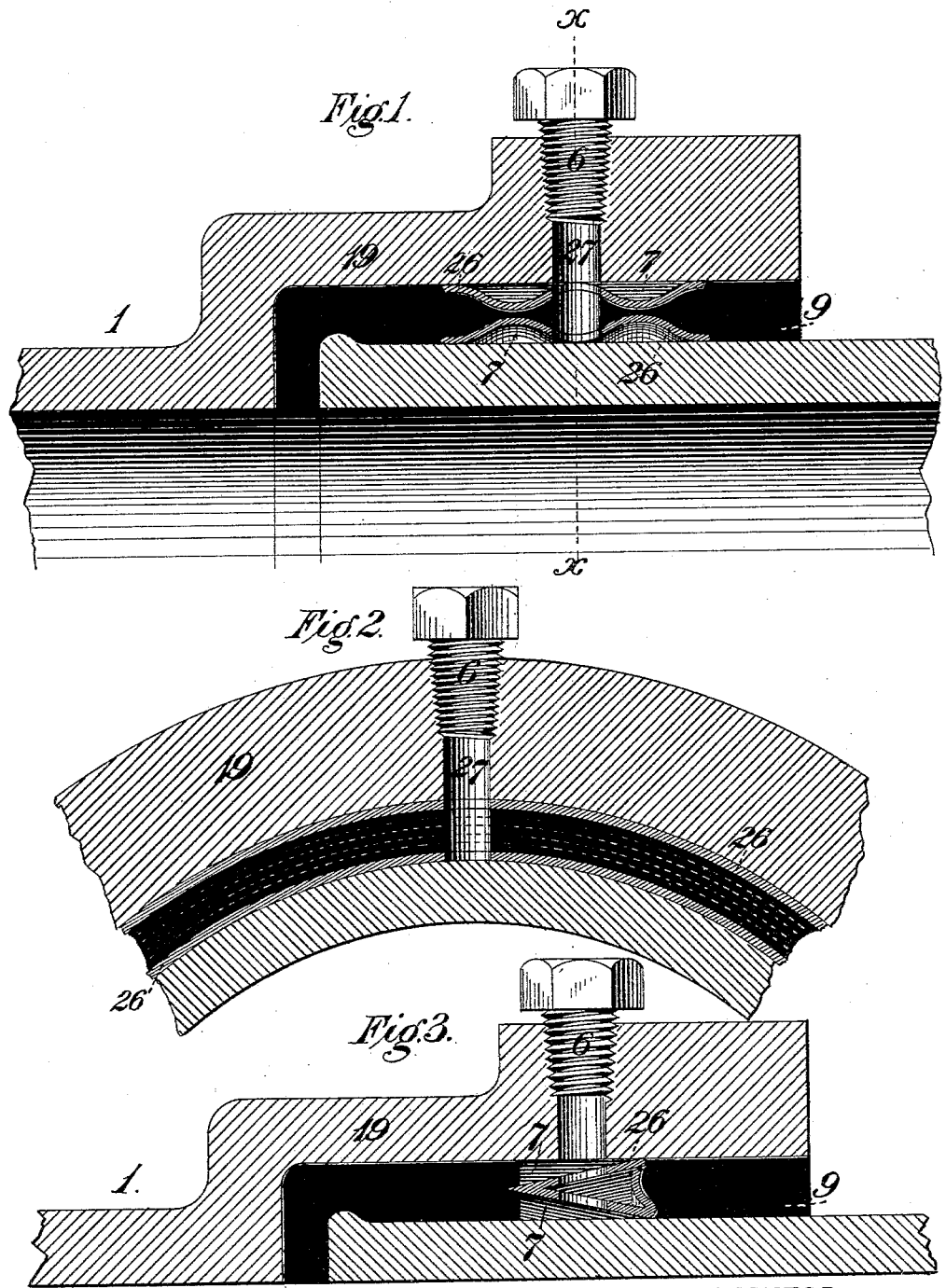

GEORGE WESTINGHOUSE, JR., OF PITTSBURG, PENNSYLVANIA.

PIPE-JOINT FOR GAS-MAINS.

SPECIFICATION forming part of Letters Patent No. 318,841, dated May 26, 1885.

Application filed April 25, 1885. (No model.)

*To all whom it may concern:*

Be it known that I, GEORGE WESTINGHOUSE, Jr., residing at Pittsburg, in the county of Allegheny and State of Pennsylvania, a citizen of the United States, have invented or discovered a certain new and useful Improvement in Pipe-Joints for Gas-Mains, of which improvement the following is a specification.

In the accompanying drawings, which make part of this specification, Figure 1 is a longitudinal central section through a pipe joint or coupling embodying my invention; Fig. 2, a transverse section through the same at the line $x$ $x$ of Fig. 1; and Fig. 3, a longitudinal section illustrating a modification.

The object of my invention is to provide simple, effective, and readily applicable means for reducing the liability to leakage at the joints of mains for the conveyance of gas or other fluids and detecting and arresting the escape of fluid, if any, thereat; to which end my invention, generally stated, consists in the combination, with a "bowl-and-spigot" joint, of one or more rings or plates, each fitting closely against the surface of one of the pipes within the socket or bowl, and being of curved, inclined, or corrugated section, so as to form a chamber or receptacle between its inner face and the adjacent surface of the pipe and a packing or filling occupying the space within the joint exterior to said ring or rings.

The improvement claimed is hereinafter more fully set forth.

In the practice of my invention, I provide a pipe joint or coupling of what is known as the "bowl-and-spigot" class—that is to say, in which a bowl or socket, 19, is formed at the end of one of the pipe-sections, 1, of a main to receive the spigot end of the adjacent section, with one or more rings or annular plates, 26, (two of said rings being employed in the instance shown,) each of which is curved, bent, or corrugated in section, and is sprung tightly into or upon one of the pipe-sections within the joint, so as to fit tightly at its ends against said section, and to form between its inner surface and the surface of the pipe one or more circumferential chambers or receptacles, 7, each of which is interposed between the outer end of the bowl and the inner end of the spigot, said chambers thus serving to intercept and receive any leakage of fluid passing from the main. The space within the socket and between the outer faces of the rings is filled with a tight packing, 9, of lead or other suitable material, fitting closely against the surfaces of the pipes at all portions of the joints unoccupied by the rings 26. An opening or vent, 27, closed by a suitable tight plug, 6, is formed in the bowl 19, and communicates with the chamber 7, and where, as in the present instance, more than one chamber is formed in the ring or rings the opening is drilled through the same, so as to communicate with two of the chambers of each ring. Any fluid which may leak from the main will be received by the chambers 7, which may be connected with a detector or escape-pipe leading to a suitable point of discharge, which may be either directly into the atmosphere or into a leakage line or low-pressure line, or the chambers 7 may be filled with a semi-liquid material under pressure, or a constant fluid-pressure may be maintained therein, as set forth in other applications for Letters Patent filed by me. The rings being forced more tightly against the pipes by the interposed packing 9 and possessing a greater or less degree of elasticity the tightness of the joint will be correspondingly promoted. Where joints of this character are employed in lines carrying only a comparatively low pressure, as for illuminating purposes, a short stand-pipe may be fitted into the vent 27 and filled with water, glycerine, or other liquid, the pressure of which due to gravity will be sufficient to prevent any outward escape of gas from the main.

In the modification illustrated in Fig. 3, in lieu of first fitting the rings closely to the pipe-sections and thereafter filling the space in the joint with packing, the inner portion of the joint is first partly filled with lead or other packing and a ring, 26, of beveled or inclined section driven into and calked in the lead, bearing at its opposite end against the pipe-sections and forming chambers 7 between its sides and the pipe-sections, as before described. The portion of the joint exterior to the ring is then filled with packing.

I claim herein as my invention—

1. The combination, with a bowl-and-spigot joint or coupling, of a ring or annular plate of curved, inclined, or corrugated section fitting against the surface of one of the pipe-sections, and packing filling the space within the joint which is unoccupied by the ring, substantially as set forth.

2. The combination, with a bowl-and-spigot joint or coupling, of one or more rings or annular plates of curved section, each fitting against one of the pipe-sections and forming a chamber or receptacle between its inner surface and the adjacent pipe-section, packing filling the space within the joint exterior to the ring or rings, and a vent or escape passage communicating with the chamber or chambers of the rings, substantially as set forth.

In testimony whereof I have hereunto set my hand.

GEO. WESTINGHOUSE, JR.

Witnesses:
J. SNOWDEN BELL,
R. H. WHITTLESEY.